United States Patent
Usui et al.

(10) Patent No.: US 6,660,195 B2
(45) Date of Patent: Dec. 9, 2003

(54) PROCESS FOR PRODUCING A SKIN MATERIAL-LAMINATED FOAMED THERMOPLASTIC RESIN MOLDING

(75) Inventors: Nobuhiro Usui, Takatsuki (JP); Takeo Kitayama, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 213 days.

(21) Appl. No.: 09/795,398

(22) Filed: Mar. 1, 2001

(65) Prior Publication Data

US 2001/0021457 A1 Sep. 13, 2001

(30) Foreign Application Priority Data

Mar. 10, 2000 (JP) .................................... 2000-066222
Mar. 21, 2000 (JP) .................................... 2000-077337
Dec. 5, 2000 (JP) .................................... 2000-369983
Dec. 5, 2000 (JP) .................................... 2000-369993

(51) Int. Cl.[7] ............................................. B29C 44/06
(52) U.S. Cl. ........................... 264/46.4; 264/50; 264/54
(58) Field of Search ........................ 264/46.4, 50, 54

(56) References Cited

U.S. PATENT DOCUMENTS

| 5,252,269 A | | 10/1993 | Hara et al. | |
|---|---|---|---|---|
| 5,281,376 A | | 1/1994 | Hara et al. | |
| 5,304,579 A | | 4/1994 | Hara et al. | |
| 5,437,823 A | * | 8/1995 | Hettinga et al. | ........... 264/45.5 |
| 5,972,259 A | * | 10/1999 | Hettinga | ..................... 264/45.5 |
| 6,129,870 A | * | 10/2000 | Hettinga | ..................... 264/40.5 |
| 6,146,562 A | * | 11/2000 | Hettinga | ..................... 264/45.5 |

FOREIGN PATENT DOCUMENTS

JP         06344362 A      12/1994

* cited by examiner

Primary Examiner—Allan R. Kuhns
(74) Attorney, Agent, or Firm—Fitch, Even, Tabin & Flannery

(57) ABSTRACT

The present invention relates to a process for producing a skin material-laminated foamed thermoplastic resin molding and to foamed thermoplastic resin moldings, said process comprising a skin material and a thermoplastic resin foam integrally laminated with the skin material, wherein the process uses a mold comprising a male and female mold members which are mutually slidable and whose cavity clearance (t) is adjustable, the process comprising the following steps (1)–(5): (1) skin material supply step, (2) resin injection step, (3) compression step, (4) foaming step and (5) cooling and releasing step, and said moldings that are a panel-shaped foamed thermoplastic resin molding comprising a substrate and a projection standing on the substrate wherein the projection has a mean expansion ratio of not greater than 1.1 times and the substrate has a mean expansion ratio of not less than 1.3 times.

6 Claims, 5 Drawing Sheets

(b)

PROCESS FOR PRODUCING A SKIN MATERIAL-LAMINATED FOAMED THERMOPLASTIC RESIN MOLDING

BACKGROUND OF THE INVENTION

1. Field of the Invention

The present invention relates to a process for producing a skin material-laminated foamed thermoplastic resin molding and to foamed thermoplastic resin moldings. More particularly, the invention is directed to a process for producing a panel-shaped foamed thermoplastic resin molding having a skin material laminated, the molding being lightweight, highly rigid and suitable for automotive interior parts, and to products obtainable by the process and the like.

2. Description of the Related Art

Skin material-laminated thermoplastic resin moldings which are produced by molding a thermoplastic resin by injection molding or the like and also providing a skin material on the surface of the molded resin and which are used for automotive interior parts or the like are conventionally employed. Such moldings, however, have high densities and high weights, so there are demands for reduction in weight and improvement in quality particularly in the field of automotive interior parts. In particular, there is a strong demand for improvement in external quality even for the back sides of skin material-laminated moldings.

As automotive interior parts, a technique in which a skin material is laminated and weight reduction is ensured through the use of a foamed thermoplastic resin whose inner layer is a foamed layer is known in Japanese Patent Kokai Publications Nos. 6-344362 and 4-148907.

In the above publications, the mold stamping molding method is disclosed. In other words, a technique of molding is disclosed, the technique comprising setting a skin material between a pair of an upper and lower mold members, making the clearance between the mold members to be a specific value, injecting a foaming agent-containing polypropylene resin composition to between the skin material and the lower mold member and simultaneously closing the mold members, thereby forming the resin into a predetermined shape and bonding the resin to the skin material, then opening the mold members, thereby foaming the resin, and then cooling and solidifying the resin.

In the technique disclosed in the above publications, the injection of a resin is executed with the clearance between the mold members widened in order to reduce resin supply pressure. This results in insufficient prevention of the evaporation of a foaming agent, the so-called gas escape, that occurs during the injection of a foaming agent-mixed molten resin into the mold. This causes appearance failure in the back surface of a substrate due to the gas escape and, therefore, the substrate with a skin material laminated thereon has unsatisfactory appearance in its back surface.

SUMMARY OF THE INVENTION

The object of the present invention is to provide a process for producing a skin material-laminated foamed thermoplastic resin molding by which the evaporation of a foaming agent, the so-called gas escape, that occurs during the injection of a molten resin into a mold can be sufficiently prevented and, as a result, a foamed layer is surely formed and by which a foamed thermoplastic resin molding having good external appearance in its anti-skin material-laminated side, namely the side of the substrate in the molding reverse to its skin material-laminated surface, and to provide products obtainable by the process and the like.

The present inventors studied a technique for preventing the gas escape from a foaming agent-containing molten thermoplastic resin with in stamping molding. To make a resin supply clearance of a mold wide in order to greatly reduce the required injection pressure to inject a molten resin in comparison with general injection molding is considered to be an essential feature of the conventional stamping molding. In contrast to this, after finding that the gas escape can be effectively prevented through setting the specific resin supply clearance which is relatively smaller than that at which stamping molding cannot be conducted because of high resin injection pressure required, the present inventors have reached the present invention.

That is, the present invention is a process for producing a foamed thermoplastic resin molding comprising a skin material and a thermoplastic resin foam integrally laminated with the skin material, wherein the process uses a mold comprising a male and female mold members which are mutually slidable and whose cavity clearance (t) is adjustable, the process comprising the following steps (1)–(5):

(1) skin material supply step for supplying a skin material with the female and male mold members opened;

(2) resin injection step including bringing the male mold member and the female mold member close mutually to make the t to be a resin injection clearance less than (C+5) mm (C is the thickness of the skin material before molding), and injecting a foaming agent-containing molten polyolefin-based resin through a resin supply opening provided in one of the male and female mold members to between the skin material and the mold member;

(3) compression step for shaping the injected polyolefin-based resin by filling up it to an end of a mold cavity by making the t smaller than the resin injection clearance by compression, and simultaneously laminating the skin material integrally with the polyolefin-based resin;

(4) foaming step for forming a foamed thermoplastic resin molding by forming a foamed layer through foaming the polyolefin-based resin injected in its molten state through enlarging the t after the completion of the shaping of the polyolefin-based resin; and (5) cooling and releasing step including cooling the foamed thermoplastic resin molding in the mold, then opening the mold and taking out the foamed thermoplastic resin.

The execution of the above steps results in the sufficient prevention of the evaporation of a foaming agent during the injection of a foaming agent-containing molten resin into a mold, resulting in the certain formation of a foamed layer and enabling foamed thermoplastic resin moldings with excellent external appearance in their anti-skin material-laminated surfaces of their substrates to be produced.

Particularly, letting the resin injection clearance of the mold in resin supply step (2) be less than (C+5) mm, at which clearance it was heretofore thought to be impossible to conduct molding successfully by stamping molding due to too high resin injection pressure, can effectively prevent a gas to escape and can shorten the time required for the opening and closing movement of a mold after the injection of a molten thermoplastic resin.

As the skin material to be used in the present invention can be employed various kinds of skin materials having a single layer or a plurality of layers such as those conventionally used. In the case of using a skin material having a cushion layer laminated as a multiple-layered skin material, it is desirable to use a skin material having a cushion layer with a compression modulus of not greater than 0.3 MPa and it is required to provide a backing layer that will serve as a protective layer of the cushion layer.

The panel-shaped foamed thermoplastic resin molding, which is the product of the present invention, can be suitably used particularly for automotive interior parts, specific examples thereof including instrument panels, seat backs, partition boards, console boxes and door trims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Figure 5:
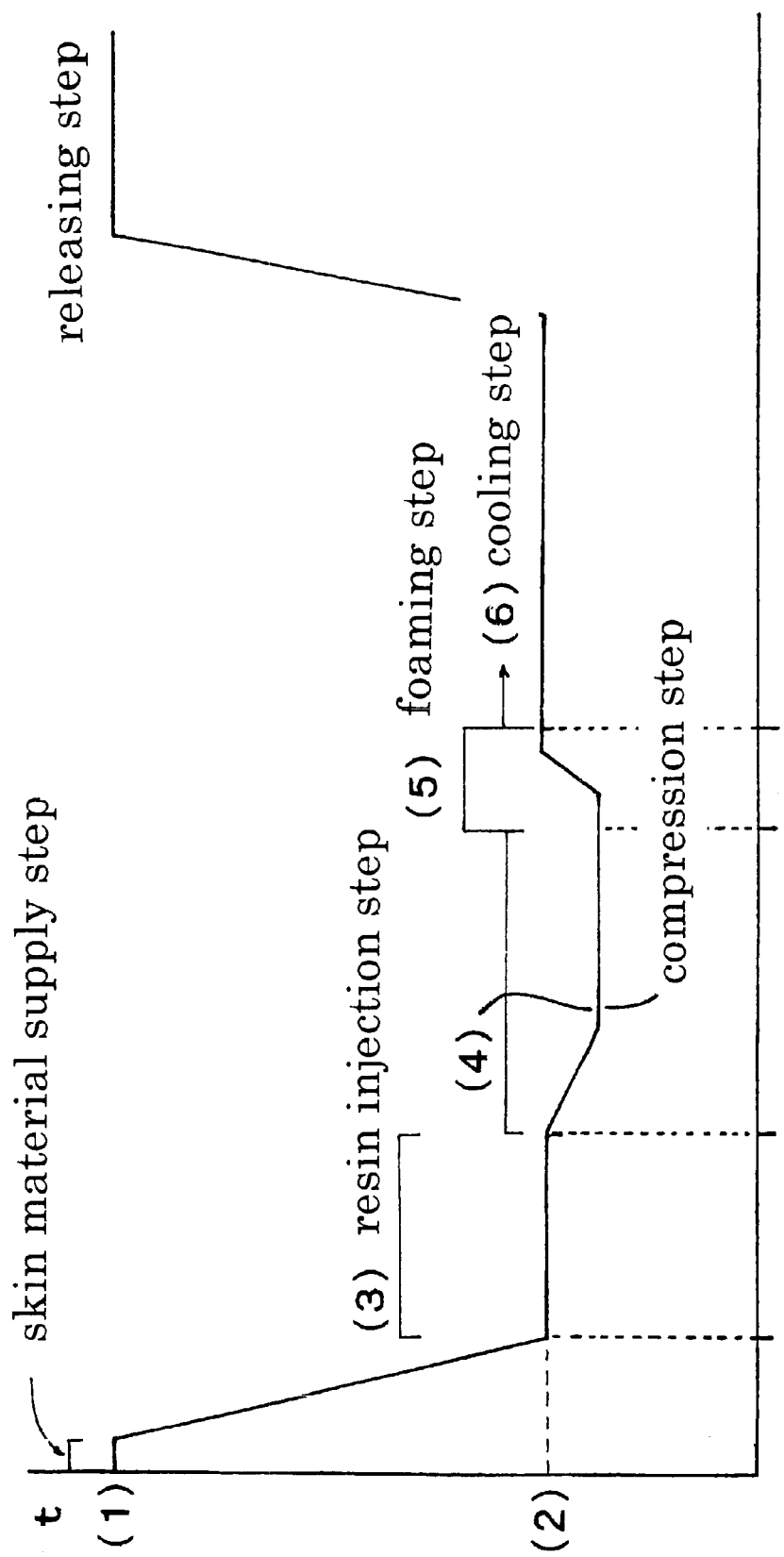
FIG. 5 is a diagram showing states of adjustment of a mold cavity clearance in every production steps.

An example of the production of a panel of the present invention, the panel having a skin material layer laminated and having a projection (i.e. projecting portion), is explained based on FIGS. 1–4. In FIG. 5, the mold cavity clearances, the t's, formed in every steps illustrated in FIGS. 1–4 are shown as a diagram.

In the production process of the present invention is used a set of mold comprising a female mold member 23 and a male mold member 25 that is fixed to a platen 26 wherein the cavity clearance (t) can be set at will through the relative movement of the female mold member 23 and the male mold member 25.

Here, in the case of producing a panel-shaped foamed thermoplastic resin molding having a substrate and a projection standing on the substrate, it is well to form a projection-forming cavity in one of the female and male mold members.

Figure 1:
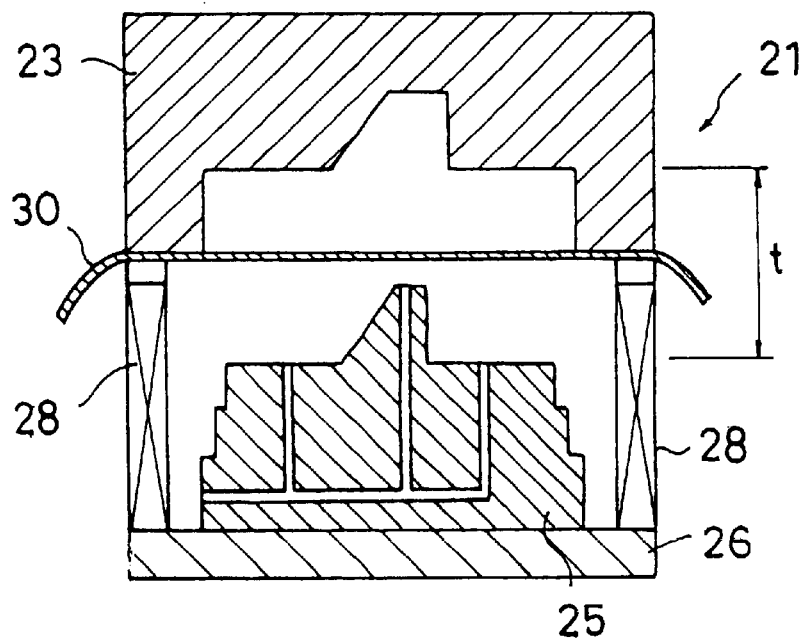
FIG. 1 illustrates skin material supply step in an example of the production process of the present invention.

A skin material 30 is held with an end surface of the female mold member 23 and a damper 28 (FIG. 1). At this time, the mold is widely opened so that operators can work easily (FIG. 5(1)). The skin material 30 is held with the damper 28 so that it can slip when the skin material 30 is pulled in a hollow of the mold during the molding (in skin material supply step).

Then at least one of the female mold member 23 and the male mold member 25 is moved to form a resin supply commencement clearance (FIG. 5(2)). If the resin supply commencement clearance is too wide, the foaming of a resin occurs rapidly, causing the gas escape, resulting in the damage of the external appearance of the anti-skin material laminated surface. Therefore, the resin supply commencement clearance should be less than (C+5) mm where the thickness of the skin material 30 before molding is represented by C.

Figure 2:
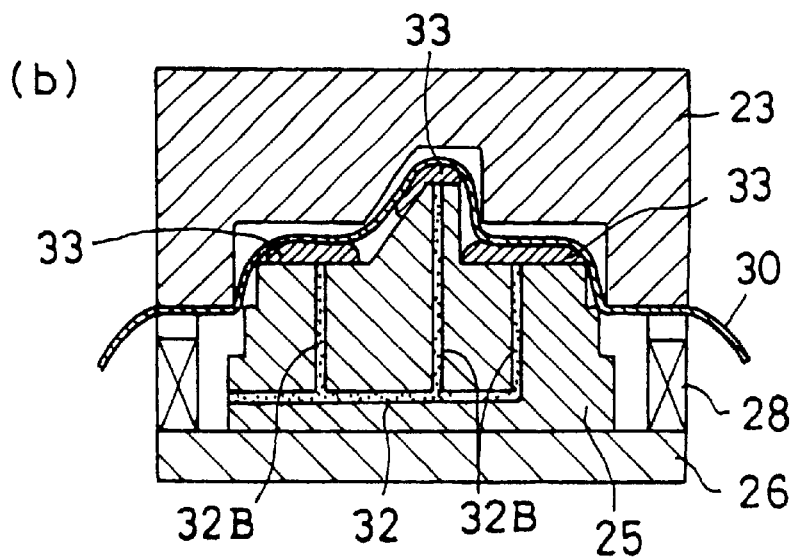
FIG. 2 illustrates resin injection step in an example of the production process of the present invention.

The step shown in FIG. 2 is one of injecting a molten thermoplastic resin 33 containing a foaming agent through a resin supply passage 32 (resin supply step, FIG. 5(3)).

The rate of the reduction of the mold cavity clearance is suitably determined in consideration of the size of a molding, the characteristic of the materials to be used and the like and it is desirable that one of the mold members, for example, the female mold member, is moved at a rate of from 1 to 50 mm/second in practical cases.

In the example depicted in this figure, three tributary passages 32B of the resin supply passage 32 are formed. The design of the resin supply passage, however, is not limited to this and may be optionally determined depending upon the shape and the size of moldings to be produced.

Figure 3:
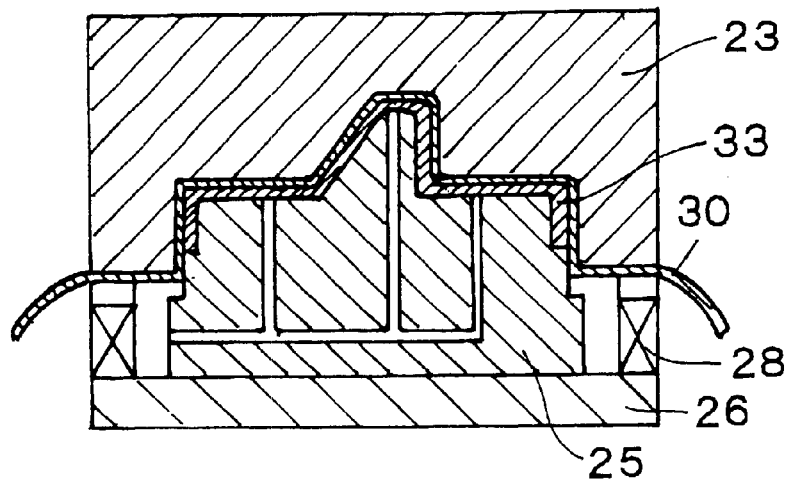
FIG. 3 illustrates compression step in an example of the production process of the present invention.
Figure 4:
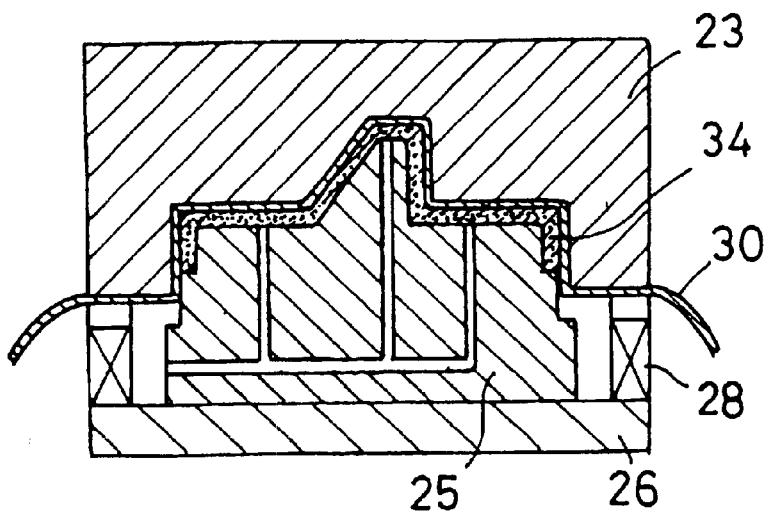
FIG. 4 illustrates foaming step in an example of the production process of the present invention.

The step shown in FIG. 3 is one of compressing a predetermined amount of a molten thermoplastic resin 33 containing a foaming agent after its injection so that the mold cavity clearance becomes not greater than the predetermined thickness of a molding. A skin layer of resin is formed through cooling a resin surface layer in the above compressed state. The skin material and the resin layer are bonded together through the compression in this step (compression step, FIG. 5(4)).

The compression time in compression step is suitably determined depending upon the thickness of a molding, the thickness of a skin layer to be formed, the temperature of the mold and the like, and is preferably from about 1 second to about 30 seconds from the considerations of practical conditions such as reduction of molding time.

The skin material 30 and the resin layer 33 are laminated together through the compression in the aforementioned compression step. Then the mold cavity clearance, t, is enlarged to the predetermined thickness of a molding (FIG. 4), thereby foaming the resin between the skin layers to form a foamed layer. As a result, a panel-shaped foamed thermoplastic resin molding 34, which is a final product comprising the skin material 30 and a substrate including the skin layer 11 of the skin material side, a foamed layer 13 and the skin layer 15 of the back side (anti-skin material laminated side) is prepared (foaming step, FIGS. 4 and 5(5)).

When the molding formed in foaming step is cooled (cooling step, FIG. 5(6)), the production of a molding is completed.

In foaming step, the mold may be opened so that the mold cavity clearance becomes wider than the predetermined thickness of a molding, followed by closing the mold to slightly reduce the t so that the mold cavity clearance becomes the predetermined thickness of the molding, followed by holding the pressure at a predetermined pressure and then cooling. The term "to slightly reduce the t" used in this situation has no particularly strict definition and usually means to make the t not greater than about the predetermined thickness of a molding.

As the thermoplastic resin to be used in the present invention, every resins conventionally used for automotive interior parts and the like can be employed without any limitations. Specifically, polyolefin-based resins such as polypropylene resins and polyethylene-based resins, polystyrene-based resins, acrylic resins such as polymethyl methacrylate resin, ABS, polyamide-based resins such as nylon-6, polyester resins, polycarbonate resins, polyphenylene ether resins, etc. may be mentioned.

The thermoplastic resin to be used in the production process of the present invention is preferably polyolefin-based resins, especially polypropylene-based resins, among the above-mentioned resins, because when these resins are used, a foaming agent-containing molten resin can be injected at a resin injection pressure as low as that applied in the conventional stamping molding even if the resin injection clearance of the mold is set less than (C+5) mm and also because foamed thermoplastic resin moldings having high strength and high rigidity can be prepared at low cost.

It is particularly desirable that the polypropylene-based resins have melt flow rates (MFR: g/10 min) of not less than 15. The use of polypropylene-based resins having MFR of not less than 25 is more desirable.

The use of high MFR polypropylene-based resins permits the gas escape to be particularly effectively prevented, resulting in the certain formation of a foamed layer, especially, resulting in moldings which satisfy the demands for light weight.

As the foaming agent to be added to the above thermoplastic resins can be employed known chemical foaming agents which are used in the production of thermoplastic resin foams. Specifically, inorganic foaming agents such as sodium bicarbonate, ammonium bicarbonate and ammonium carbonate, nitroso compounds such as N,N'-dinitrosopentamethylene tetramine, azo compounds such as azodicarobnamide, azobis(isobutyronitrile), sulfonyl hydrazides such as benzenesulfonyl hydrazide, toluenesulfonyl hydrazide and diphenylsulfone-3,3'-disulfonyl hydrazide, p-toluenesulfonyl semicarbazide, etc. can be employed as the foaming agent. In preferable embodiments, salicylic acid, urea and foaming aids containing these compounds are added as needed.

The type of a chemical foaming agent is selected depending, for example, upon the melt temperature of the thermoplastic resin to be used and the desired expansion ratio. The amount of the chemical foaming agent to be added is adjusted after considering, for example, strength and density of the desired molding, and usually is from 0.1 to 5 parts by weight relative to 100 parts by weight of the resin.

It is also possible to mix liquid or gaseous carbon dioxide and/or nitrogen with the thermoplastic resins by pressure in place of the aforementioned chemical foaming agents.

As the skin material in the foamed thermoplastic resin molding of the present invention may be used known skin materials. Specific skin materials include woven fabrics, non-woven fabrics, knitted fabrics, sheets and films made of thermoplastic resin or thermoplastic elastomer. Moreover, composite skin materials may be used in which non-foamed sheets made of polyurethane, rubber, thermoplastic elastomer, etc. are laminated with the above-mentioned skin materials.

In a preferred embodiment, the skin material has a further cushion layer in its side where the skin material is laminated to a foamed thermoplastic resin that will become a substrate. The materials to form such a cushion layer are exemplified by polyurethane foam, EVA foam, polypropylene foam and polyethylene foam. Materials which have small compression permanent deformations and have compression moduli of not greater than 0.3 MPa which provide proper soft feeling to the skin materials are most desirable.

In the case where a skin material is provided with a cushion layer, it is important to provide a backing layer, which will be a protective layer. Such a backing layer can be exemplified by woven fabrics, non-woven fabrics, knitted fabrics, sheets or films of thermoplastic resin or thermoplastic elastomer. The use of non-woven fabrics is preferable from the viewpoints of formability, cost and the like.

Moreover, as a protective layer of the cushion layer, a woven fabric, non-woven fabrics knitted fabrics sheets and films made of thermoplastic resin or thermoplastic elastomer in the form of a backing layer may be laminated to the cushion layer.

The present invention also provides foamed thermoplastic resin moldings.

For instance, the whole panel-shaped resin molding produced by the known technique disclosed in Japanese Patent Kohkoku Publication No. 7-77739 is constituted of a foam. Such a molding has a projection such as a rib and a boss, which is usually formed of a non-foamed resin, for the purpose of attachment of the molding to an automobile body or reinforcement of a flat substrate.

However, when a three-dimensional panel having a projection such as a rib and a boss made of non-foamed resin is produced by the known technique, there may arise a problem that the substrate on which the projection is formed shrinks to form a sink mark and as a result the panel becomes a product with poor external appearance.

In contrast to this, the foamed thermoplastic resin molding of the present invention is lightweight and highly rigid and has no sink mark in its substrate on which a projection is formed and has excellent apparent characteristics.

Such a foamed thermoplastic resin molding of the present invention is, for example, characterized by being a panel-shaped foamed thermoplastic resin molding comprising a substrate and a projection standing on the substrate wherein the projection has a mean expansion ratio of not greater than 1.1 times and the substrate has a mean expansion ratio of not less than 1.3 times.

That is, by forming the projection, such as a rib and a boss, as a foam having a mean expansion ratio of not greater than 1.1 times while maintaining a mean expansion ratio of the substrate high, a panel-shaped foamed thermoplastic resin molding can be obtained which is lightweight and highly rigid and has sufficient strength in its projection such as a rib and a boss, and has no sink mark in its substrate on which the projection is formed.

The whole projection may be a foam having a mean expansion ratio of not greater than 1.1 times or the projection may have a skin layer/foamed layer structure comprising a foamed layer in the center of the projection and a skin layer which is non-foamed or has a lower expansion ratio in the side of the side surface of the projection. In the case of the skin layer/foamed layer structure, the thickness of the foamed layer formed in the center of the projection is preferably not greater than 60% of the total thickness of the projection from the strength aspect.

It is a preferred embodiment that the aforementioned panel-shaped foamed thermoplastic resin molding has a skin material layer on the surface of its substrate since this enables the molding to freely have high quality feeling as interior parts and can extend the application range of the molding.

The panel-shaped thermoplastic resin molding of the present invention is suitably applicable particularly for automotive interior parts, examples thereof including instrument panels, seat backs, partition boards, console boxes and door trims.

The mode for carrying out the present invention concerning the panel-shaped foamed thermoplastic resin molding is explained based on drawings.

Figure 6:
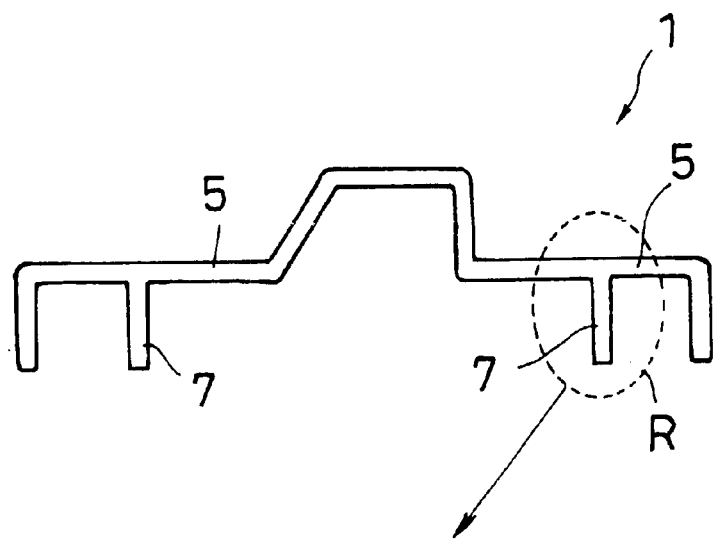
FIGS. 6(a)–(b) schematically illustrate a panel-shaped foamed thermoplastic resin molding having a projection wherein a foamed layer is formed inside the projection.
Figure 6:
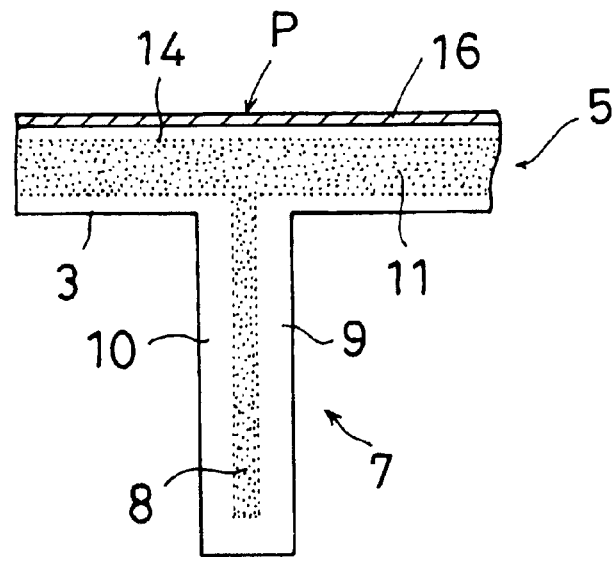

FIG. 6 shows an example of the sectional shape of a panel-shaped foamed thermoplastic resin molding having a projection (henceforth, referred simply to as a panel).

The panel 1 comprises a substrate 5 and a projecting rib 7 standing on the back side of the substrate, which is formed for the purpose of the improvement of panel strength and the attachment of the panel to a automobile body.

The vicinity of the rib 7 is magnified in FIG. 6(b). The panel 1 is provided with a skin material 16 in its front side and the substrate is constituted of a skin layer 14 in the skin material side, a foamed layer 11 and a skin layer 13 in the back side. As for the structure of the substrate 5, it is preferable that the skin layer 14 in the skin material side is thinner than the skin layer 13 in the back side since the skin material layer can have soft feeling.

In the example shown in FIG. 6(b), the rib 7 has a skin layer/foamed layer structure constituted of low-foamed or non-foamed skin layers 9, 10 and a foamed layer 8 formed therebetween. When the rib 7 is non-foamed, a recess is liable to be formed in a surface P of the substrate reverse to the surface where the rib 7 stands, due to shrinking. It seems that the foamed layer 8 formed in the rib 7 generates force to expand at the joint to the substrate 5 as shown in this figure, preventing the formation of a sink mark at the P position effectively.

For the determination of the expansion ratio of the rib 7, the setting of the rib thickness and the setting of the location of a cooling piping in the mold are important.

The rib thickness is usually not greater than 7 mm and preferably not greater than 3 mm. As the rib becomes thicker, there increase the necessities of making the location of the cooling piping in the mold closer and of increasing the number of the cooling piping in order to reduce the expansion ratio of the rib.

The expansion ratio of the rib 7 is not limited as long as the expansion ratio of the whole projection, namely the rib or the like, is not greater than 1.1 times.

Figure 7:
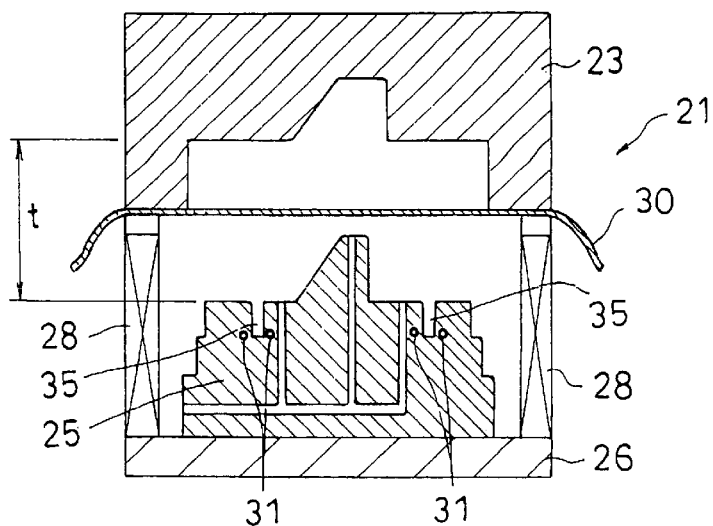
FIGS. 7(a)–(b) illustrate an example of production steps of a panel-shaped foamed thermoplastic resin molding.
Figure 7:
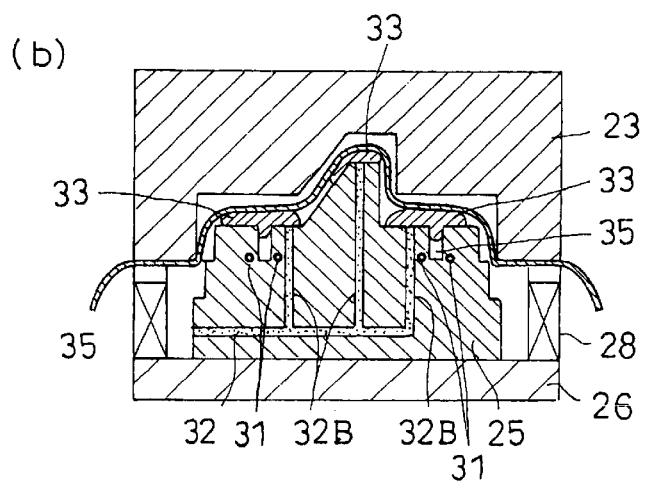
Figure 7:
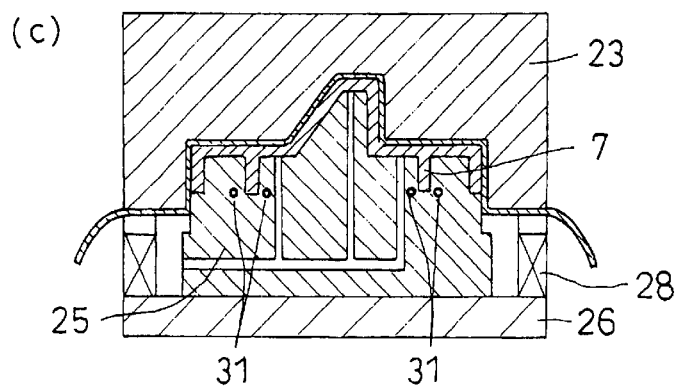

An example of the preparation of a panel having a projection according to the present invention, the panel having a skin material layer laminated on the surface of the panel, is explained based on FIG. 7. The production of the panel uses a set of mold comprising a female mold member 23 and a male mold member 25 that is fixed to a platen 26 and has a rib forming cavity formed therein wherein the cavity clearance (t) can be set at will through the relative movement of the female mold member 23 and the male mold member 25. The relative movement of the female mold member 23 and the male mold member 25 may be executed by moving either one or both of the mold members.

The male mold member 25 having a rib is provided with a cooling pipe 31 specially designed for cooling a rib. Cooling piping for cooling the whole product formed in the male and female mold members are not depicted.

The mold is opened, and a skin material 30 is supplied and held between the end surface of the female mold member 23 and a damper 28 (FIG. 7(a)). The skin material 30 is held with the damper 28 so that the skin material 30 can slip when it is pulled in a hollow of the mold during the molding.

Then the cavity clearance is reduced to form a resin supply commencement clearance. In the case where the resin supply commencement clearance is too wide, the foaming of a resin occurs rapidly and may result in unsatisfactory formation of cells due to the escape of the foaming agent. It is also preferable to bring the male mold member and the female mold member close mutually so that the cavity clearance becomes less than (C+5) mm where C is the thickness of the skin material 30 before molding.

The step illustrated in FIG. 7(b) is one of injecting a molten thermoplastic resin 33 containing a foaming agent through a resin supply passage 32. In this example, three tributary passages 32B of the resin supply passage 32 are formed. The design of the resin supply passage, however, is not limited to this and may be optionally determined depending upon the shape and the size of moldings to be produced.

After injecting a predetermined amount of the molten thermoplastic resin 33 containing a foaming agent, the resin is compressed so that the mold cavity clearance becomes not greater than the predetermined thickness of a molding. A resin surface layer is cooled at that state, forming a skin layer of resin. Through the execution of this compression step, the skin material and the resin layer are bonded together, and at the same time the resin is filled up into the rib forming cavity 35 formed in the male mold member 25, forming a rib 7. Next, the mold is opened so that the mold cavity clearance reaches the predetermined thickness of a molding. This causes the resin between the skin layers to foam, forming a foamed layer. As the result, a panel-shaped foamed thermoplastic resin molding, which is a final product, is obtained In the above-mentioned production process, although the reduction rate of the mold cavity clearance may be optionally set, it is desirable, for example, that the female mold member 23 is moved at a rate of from 1 to 50 mm/second. Moreover, it is preferable that the injection pressure of the molten resin in resin injection step is from 0.5 MPa to 10 MPa.

Moldings without any skin materials laminated can be produced in the same manner except that skin material supply step is eliminated.

An example that shows the constitution and the effect of the present invention concretely is described below by taking, as an example, the molding conducted after attaching a mold comprising paired female and male mold members shown in FIG. 1 to a press machine having a clamping force of 500 tons.

As a skin material, one constituted of three layers was used wherein a 3-mm thick polyurethane foamed layer having a compression modulus of 0.2 MPa is laminated on a 0.5-mm thick polyvinyl chloride sheet and a 0.2-mm thick non-woven fabric weighing 50 g/m$^2$ is provided as a backing material.

As a foamable thermoplastic resin for a substrate, polypropylene (Sumitomo Noblene AZ564 manufactured by Sumitomo Chemical Co., Ltd.; melt flow rate 30 g/10 minutes) was used with being mixed with 3 parts by weight, relative to 100 parts by weight of the polypropylene, of an inorganic foaming master batch (Cellmic MB3072 manufactured by Sankyo Chemical Co., Ltd.) and being melted over heating at 200° C.

The forming procedures are as follows:
(i) A skin material (30) was placed between a female mold member (23) and a male mold member (25) both of which were set at 60° C. The female mold member (23) was moved and the pressing was quitted when the mold cavity clearance (t) reached 8 mm (the thickness of the skin material+4.3 mm). Then the heated and molten foamable thermoplastic resin was supplied to between the skin material (30) and the male mold member (25) through a resin supply passage (32). The mold was closed at a compression rate of 10 mm/sec, thereby shaping the skin material (30) and the molten foamed thermoplastic resin substrate (33) by compression to integrally laminate and, at the same time, forming a skin layer in the surface of the substrate. The conditions of the shaping by compression were as follows. Compression was conducted at a surface pressure of 5 MPa for 2 seconds. The cavity clearance during the compression was 2.5 mm.

(ii) Right after the shaping by compression, the female mold member (23) was moved by 2 mm toward the mold-opening direction, thereby foaming the substrate's core part in which cooling and solidification did not proceed yet and the resin was still in a molten state. Cooling was continued for 50 seconds at that state.

After the cooling, a molding taken out had a section including fine cells from which no foaming gas had escaped. Moreover, the front side where the skin material was laminated and the back side, which was the substrate surface, had good external appearance with no defects.

Comparative Example

Molding was executed in the same manner as Example described above except setting the mold cavity clearance (t) defined in the supply of the heated and molten foaming thermoplastic resin in (i) of the above Example at 15 mm (the thickness of the skin material C+11.3 mm).

The molding obtained had a section including very coarse cells due to the escape of a foaming gas. The substrate surface, which was the side reverse to the skin material laminated side, had streak-like defects of appearance due to the escape of the gas.

What is claimed is:

1. A process for producing a foamed thermoplastic resin molding comprising a skin material and a thermoplastic resin foam integrally laminated with the skin material, wherein the process uses a mold comprising a male and female mold members which are mutually slidable and whose cavity clearance (t) is adjustable, the process comprising the following steps (1)–(5):

(1) skin material supply step for supplying a skin material between the female and male mold members while said members are open with respect to each other;

(2) resin injection step including bringing the male mold member and the female mold member close together to make the t to be a resin injection clearance less than (C+5) mm, wherein C is the thickness of the skin material before molding, and injecting a foaming agent-containing molten polyolefin-based resin through a resin supply opening provided in one of the male and female mold members to between the skin material and the mold member, wherein the injection step is commenced at a resin injection clearance of less than (C+5);

(3) compression step for shaping the injected polyolefin-based resin by filing it up to an end of a mold cavity by making the t smaller than the resin injection clearance by compression, and simultaneously laminating the skin material integrally with the polyolefin-based resin;

(4) foaming step for forming a foamed thermoplastic resin molding by forming a foamed layer through foaming the polyolefin-based resin injected in its molten state through elongating the t after the completion of the shaping of the polyolefin-based resin; and (5) cooling and releasing step including cooling the foamed thermoplastic resin molding in the mold, then opening the mold and taking out the foamed thermoplastic resin.

2. The process for producing a foamed thermoplastic resin molding according to claim 1 wherein the skin material comprises a cushion layer having a compression modulus of not greater than 0.3 MPa and a backing layer.

3. The process for producing a foamed thermoplastic resin molding according to claim 2 wherein the backing layer of the skin material is a non-woven fabric.

4. The process for producing a foamed thermoplastic resin molding according to claim 1 further comprising a step for compressing by slightly reducing the t after the completion of the foaming step (4).

5. The process for producing a foamed thermoplastic resin molding according to claim 1 wherein the polyolefin-based resin is a polypropylene-based resin.

6. The process for producing a foamed thermoplastic resin molding according to claim 1 wherein one of the female and male mold members has a projection-forming cavity.

* * * * *